United States Patent
Thawani et al.

(10) Patent No.: US 8,029,344 B2
(45) Date of Patent: Oct. 4, 2011

(54) DOOR ASSEMBLY FOR CLIMATE CONTROL SYSTEM

(75) Inventors: Prakash Thawani, Bloomfield Hills, MI (US); Zhengyu Liu, Novi, MI (US)

(73) Assignee: Ford Motor Company, Dearborn, MI (US)

( * ) Notice: Subject to any disclaimer, the term of this patent is extended or adjusted under 35 U.S.C. 154(b) by 403 days.

(21) Appl. No.: 11/564,734

(22) Filed: Nov. 29, 2006

(65) Prior Publication Data
US 2008/0125027 A1   May 29, 2008

(51) Int. Cl.
*B60S 1/54* (2006.01)
*B60H 1/00* (2006.01)

(52) U.S. Cl. .................. 454/121; 454/126; 165/41
(58) Field of Classification Search .......... 454/121, 454/126; 165/41, 42
See application file for complete search history.

(56) References Cited

U.S. PATENT DOCUMENTS

| | | | |
|---|---|---|---|
| 3,629,094 A * | 12/1971 | Silverblatt | ............ 202/248 |
| 5,203,737 A | 4/1993 | Joseph et al. | |
| 5,263,893 A | 11/1993 | Hoffman et al. | |
| 6,009,934 A * | 1/2000 | Sunaga et al. | ............ 165/42 |
| 6,047,951 A | 4/2000 | Ito et al. | |
| 6,193,600 B1 | 2/2001 | Ito et al. | |
| 6,386,966 B1 | 5/2002 | Kuwayama et al. | |
| 6,416,404 B2 * | 7/2002 | Ozeki | ............ 454/156 |
| 6,428,409 B1 | 8/2002 | Egami et al. | |
| 6,450,877 B2 | 9/2002 | Tsurushima et al. | |
| 6,540,604 B1 | 4/2003 | Parekh et al. | |
| 6,579,167 B1 * | 6/2003 | Demeniuk | ............ 454/126 |
| 6,913,529 B2 | 7/2005 | Seki | |
| 2004/0038639 A1 | 2/2004 | Yasuno et al. | |
| 2004/0069444 A1 * | 4/2004 | Clifford | ............ 165/42 |

* cited by examiner

*Primary Examiner* — Steve McAlister
*Assistant Examiner* — Helena Kosanovic
(74) *Attorney, Agent, or Firm* — Tung & Associates; Raymond L. Coppiellie

(57) ABSTRACT

A motor vehicle climate control system that utilizes a door to selectively open and close an inlet formed in a housing of the climate control system. The housing includes a wall having a seal surface. The seal surface is spaced outwardly from an inner surface of the wall. A seal member, typically attached to the door used to open and close the inlet, contacts the seal surface when the door is placed in a position to close the inlet.

16 Claims, 2 Drawing Sheets

DOOR ASSEMBLY FOR CLIMATE CONTROL SYSTEM

CROSS-REFERENCE TO RELATED APPLICATIONS

Not Applicable

BACKGROUND OF THE INVENTION

1. Field of the Invention

The present invention relates generally to a climate control system for use with an automotive vehicle and more specifically to a climate control system having an air inlet and a door operative to selectively open and close the inlet.

2. Description of Related Art

A motor vehicle climate control system or heating, ventilation and air conditioning (HVAC) system typically utilizes a blower to move and control airflow through the system. Air rush noise occurring in the HVAC system, is a customer comfort concern. A typical HVAC system operates in both a fresh air mode and a recirculation mode. The recirculation mode of the HVAC system draws air from the interior of the vehicle cabin or passenger compartment, while the fresh air mode draws outside air into the vehicle cabin or passenger compartment.

The HVAC system includes a selectively positionable door that opens and closes the respective fresh air inlet and recirculation air inlet and correspondingly enables operation in either the fresh air mode or recirculation mode. The door often includes a full surface or strip of foam glued around and on both sides of the door. The foam functions as a seal to minimize or reduce leakage of airflow past the door when placed in a position where the door closes either the fresh air inlet or the recirculation air inlet. In many cases, the door is pivotally mounted on the housing of the HVAC system and pivots back and forth between the respective fresh air inlet and recirculation air inlet.

The respective fresh air inlet and recirculation air inlet are typically a plurality of slots or apertures located in a flat or planar portion of the HVAC housing. As the door pivots, the radially inward portion, or that portion closest to the hinge, and the radially outward portion, or that portion farthest from the hinge, move different distances with the radially outward portion traveling a greater distance for the same angular movement of the door. The foam layer attached to the door is typically a strip having a uniform thickness. Accordingly, pivoting the door to close one of the respective inlets compresses that portion or section of the foam layer located closest to the door hinge or pivot point more than that portion or section of the foam layer located at the far end of the door or furthest from the hinge. Thus, the stiffness or compressibility of the foam layer limits the travel of the outer end of the door, that is, when the foam layer closest to the pivot point fully compresses the door travel ceases.

In many cases, when the door pivots to close either the fresh air inlet or the recirculation air inlet the stiffness or firmness of the foam layer prevents the outer end of the door from traveling the necessary distance to close the door. Failure to travel the necessary distance correspondingly reduces contact between a portion of the foam layer located at the outer or far end of the door and the housing adjacent or near the fresh air or recirculation air inlet. This allows airflow leakage at the far end of the door, which induces an objectionable door noise such as a whistling sound, door flutter or chatter.

Accordingly, it is desirable to provide a climate control system door assembly that minimizes the possibility and potential of airflow leakage when closing the fresh air or recirculation air inlet to reduce potential airflow noise such as whistling or door flutter.

SUMMARY OF THE INVENTION

The present invention is a door assembly for a climate control system. The system includes a housing having a wall, the wall having an inner surface that forms a portion of the housing. The housing forms, in part, an air inlet chamber. An inlet extends through the housing to the inner surface through which air is drawn into the inlet chamber. The wall includes a seal surface located thereon. The seal surface is disposed outwardly from the inner surface of the wall. A door, including a seal member, operates to close the inlet such that placing the door in a position to close the inlet results in the seal member engaging the seal surface.

According to one aspect of the invention, the housing includes a pocket. The pocket including a base portion and a sidewall with the inlet formed in the base portion with at least a portion of the seal surface located between the inlet and the sidewall. A further feature includes the pocket having a beveled portion extending between the base portion and the sidewall wherein the beveled portion forms an additional seal surface.

DETAILED DESCRIPTION OF THE PREFERRED EMBODIMENTS

Figure 1:
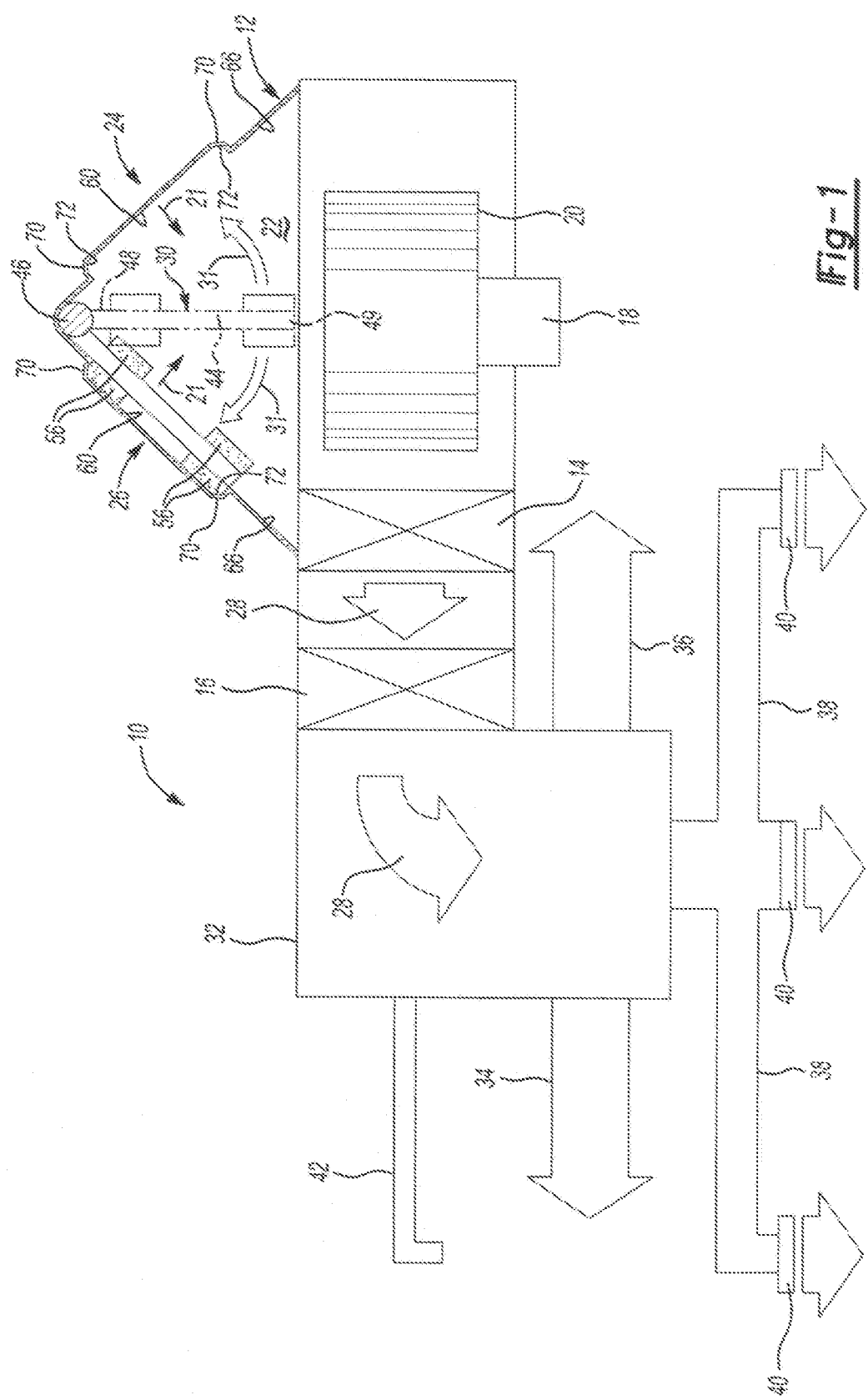
FIG. 1 is a schematic view of the climate control system utilizing a door assembly according to the present invention.

Referring now to the drawings, FIG. 1 shows a HVAC assembly, seen generally at 10, of a type typically used with an automotive vehicle. The assembly 10 includes a housing or case 12 including a heater core 14, and evaporator core 16 and a blower motor 18 driving a blower wheel 20. An inlet chamber 22 communicating with a fresh air inlet 24 and a recirculation air inlet 26 is located near the blower wheel 20. The fresh air inlet 24 is typically located such that when the fresh air inlet 24 is open, the blower wheel 20 draws air into the housing 12 from outside the vehicle passenger compartment. The recirculation air inlet 26 is located such that when open the blower wheel 20 draws air into the housing 12 from inside the vehicle passenger compartment. In either case, air drawn in through either the fresh air inlet 24 or the recirculation air inlet 26 flows through the housing 12 in the direction shown by the arrows 28. The HVAC assembly 10 further includes a door 30 pivotally attached to the housing 12 for movement in the direction illustrated by the arrows 31. As known in the art, the door 30 operates to open and close the respective fresh air inlet 24 and recirculation air inlet 26.

In operation, the blower wheel 20 forces air drawn in through either the fresh air inlet 24 or the recirculation air inlet 26 in the direction of the arrow 21 through the evaporator core 16 and heater core 14 to a distribution plenum 32. The distribution plenum 32 directs the airflow either to the defrost nozzles 34 or heater outlets 36 when the heater core 14 operates to heat the airflow. When the evaporator core 16 operates to cool the airflow, the distribution plenum 32 directs the air through the air-conditioning ducts 38 to air-conditioning outlets 40 located in the vehicle dashboard. When operating in the air-conditioning mode, a drain 42 operates to drain or remove condensation and corresponding moisture from the assembly 10.

Figure 2:
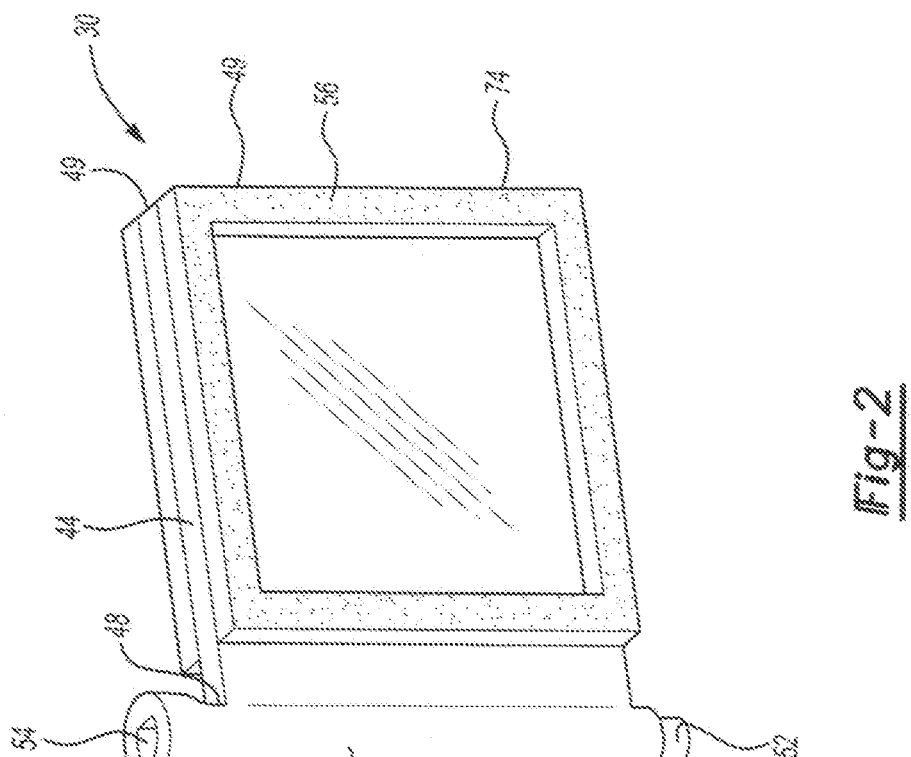
FIG. 2 is an enlarged, exploded view of the door assembly of FIG. 1.
Figure 2:
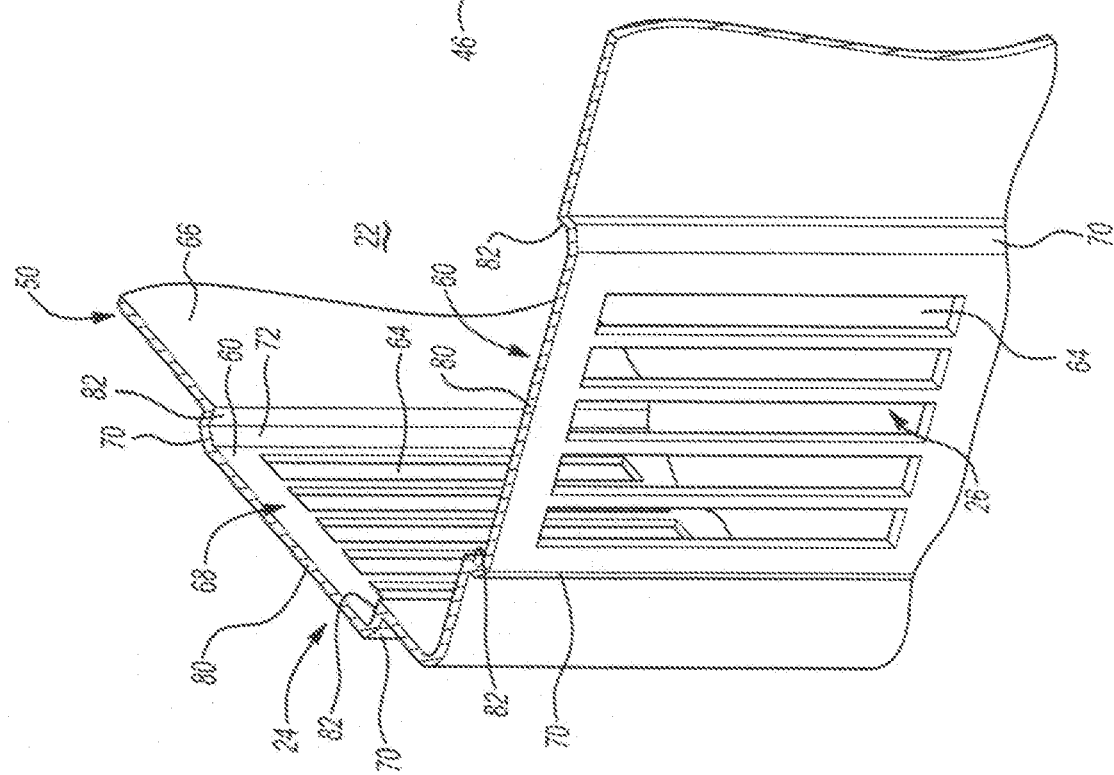

As illustrated in FIGS. 1-2 the door 30 includes a door panel 44 having a cylindrical pivot member 46 located on a proximal end 48 of the door panel 44. A pivot pin 52 is located on the lower end of the pivot member 46. The pivot pin 52 is received in a known manner in a socket (not shown) located in the housing 12. A D-shaped socket 54 is located at the upper end of the pivot member 46. An actuator or drive unit (not shown) having a corresponding D-shaped drive pin is positioned such that the D-shaped drive pin fits into the D-shaped socket 54 and both supports the upper end of the pivot member 46 and positions the door panel 44. Securing the door panel 44 to the housing 12 in this manner enables the door panel 44 to swing or pivot back and forth between first and second positions. The first and second positions corresponding with opening the fresh air inlet and closing the recirculation air inlet and closing the fresh air inlet and opening the recirculation air inlet.

As disclosed herein the pivot pin 52 and D-shaped socket 54 mount the door panel 44 in position on the housing 12; however, the door panel 44 can be mounted to the housing 12 in a variety of known ways as long as it moves between first and second positions to open and close the fresh air inlet 24 and recirculation air inlet 26. As disclosed, the actuator or drive unit (not shown) operates to move the door 30 between the respective first and second positions. It should be understood that the actuator or drive unit is connected to a control unit used by an operator to position the door panel 44 and correspondingly open and close the various inlets 24, 26.

The housing 12 includes a wall 50 having an inside or inner surface 66. The inlets 24, 26 extend through the wall 50 to the inlet chamber 22. As illustrated in FIG. 2, a strip of a sealing material or seal member 56 extends around the outer peripheral edge of the door panel 44. The seal member 56 may include a compressible open-cell foam member adhesively secured to the door panel 44. The seal member 56 engages a seal surface 60 of the housing 12. The seal surface 60 extends about the periphery of the respective fresh air inlet 24 and recirculation air inlet 26 illustrated as a plurality of apertures or slots 64 located in the housing 12.

The seal surface 60 is spaced outwardly from the inner surface 66 of the wall 50 of the housing 12. Spacing the seal surface 60 outwardly from the inner surface 66 forms a pocket or compartment 68 that receives the seal member 56. The pocket 68 includes a base portion 80 and a sidewall 82. While shown herein with inner and outer or left and right sidewalls 82, the pocket 68 may include a continuous sidewall extending around each of the respective inlets 24, 26. The depth of the pocket 68, that is amount or degree of the outward spacing from the inner surface 66 of the housing 12; i.e., the length of the respective sidewall 82, is such that the portion of the seal member 56 nearest the proximal end 48 of the door panel 44 is compressed substantially the same as the outer portion of the seal member 56 located at the distal end 49 of the door panel 44. Providing the pocket or compartment 68 in the housing 12 enables the door 30, more specifically the seal member 56, to uniformly engage the seal surface 60 on each side of the inlet 24, 26. Accordingly, the present invention provides or requires less torque to actuate and hold the door panel 44 against the seal surface 60 to obtain a seal. The door panel 44 need not compress the portion of the seal member 56 located at the proximal end 48 of the door panel 44 a greater amount than that portion of the seal member 56 located at the distal end 49 of the door panel 44 to insure proper contact and engagement with the seal surface 60.

The edges or corners 70 of the pocket 68 adjacent the seal surface 60 are beveled or chamfered to provide additional sealing surfaces 72. As illustrated, the beveled or chamfered edges 70 engage the peripheral edge 74 of the seal member 56. Compressing the peripheral edge 74 provides additional sealing without increasing the torque necessary to maintain a sealed configuration between the door 30 and the housing 12. As illustrated, the door panel 44 includes a seal member 56 on both sides thereof. Accordingly, as the door panel 44 travels between the first and second positions to close and open the fresh air inlet 24 or the recirculation air inlet 26, the respective seal members 56 engage the respective pockets or compartments 68 located in the housing 12 to prevent or minimize airflow at the seal member/seal surface interface. Accordingly, the seal member 56 uniformly engages the seal surface 60 located about the peripheral edge of the apertures or slots 64 forming the respective fresh air inlet 24 and recirculation air inlet 26 in the housing 12. Further, the beveled edges 70 also provide additional seal surfaces 72 to ensure that the seal member 56 adequately seals the respective inlets 24, 26 when the door 30 closes the inlet.

While the pocket or compartment 68 is shown having a constant depth or space from the inner surface 66 of the housing 12. It may also be sloped or inclined depending upon the swing arc of the door panel 44. For example, the depth of the pocket 68 or spacing from the inner surface 66 of the housing 12 adjacent to the pivot point of the door 30 may be greater than the depth of the pocket 68 at a point spaced from the pivot point of the door 30. In addition, rather than being attached to the door panel 44, the seal members 56 may be attached to the seal surface 60 on the housing 12 wherein a seal surface located on the door panel 44 engages the seal member 56. Further, the pocket or compartment 68 holding the seal member 56 may comprise a channel extending about the periphery of the apertures or slots 64 forming the respective fresh air inlet 24 and recirculation air inlet 26. In this embodiment, the apertures or slots 64 are formed in the housing 12 such that they remain in the same plane as the inner surface 66 of the housing.

Accordingly, the present invention improves the seal between the door and the housing and correspondingly reduces airflow leakage at the door and housing interface thus reducing objectionable noise. Additionally, the present invention eliminates the need for a high torque door actuator since the seal member is not unduly compressed at one end thereof, which correspondingly improves actuator durability. The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A door assembly for a climate control system comprising:
   a housing including a wall having an inner surface, a portion of said housing forming an inlet chamber;
   said housing having a pocket formed in said wall, said pocket having a pair of outwardly extending sidewalls extending outwardly from said wall, a base portion spaced from said inner surface of said wall and between said sidewalls and at least one inlet in said base portion enabling air to be drawn into said inlet chamber;
   said pocket including a first and a second seal surface on said base portion, said first seal surface adjacent said inlet and surrounding said inlet, said first seal surface spaced outwardly from said inner surface of said wall and said second seal surface including a beveled portions extending between said base portion and said sidewalls, said beveled portions further surrounding said inlet; and a door, said door including a seal member, whereby said seal member engages both said first and said second seal surface when said door is positioned to close said inlet, wherein a first end of said door is hingedly attached to said housing outside and adjacent said pocket.

2. A door assembly for a climate control system as set forth in claim 1 wherein said seal member includes a peripheral edge, said edge engaging said beveled portion of said pocket when said door is positioned to close said air inlet.

3. A door assembly for a climate control system as set forth in claim 1 wherein both said first and said second seal surface substantially surrounds the periphery of said inlet.

4. An air intake assembly for a climate control system comprising:

a housing including a wall having an inner surface;

said housing including a fresh air inlet and a recirculation air inlet;

a first seal surface and a second seal surface adjacent said fresh air inlet said first and second seal surfaces adjacent said fresh air inlet fresh air inlet outwardly offset from said so as to form a part of a pocket in said wall;

a first seal surface and a second seal surface adjacent said recirculation air inlet said first and second seal surfaces adjacent said recirculation air inlet outwardly offset from said inner surface of said wall so as to form a part of a pocket in said door;

a door pivotably secured to said wall between said fresh air inlet and said recirculation air inlet and operative to selectively open and close said fresh air inlet and said recirculation air inlet; and a first and a second seal member attached to said door, said first seal member engaging both of said first and second seal surfaces of said fresh air inlet and said second seal member engaging both of said first and second seal surfaces of said recirculation inlet when said door operates to selectively close said fresh air inlet and engaging both of said first and second seal surfaces of said recirculation air inlet when said door operates to selectively close said recirculation air inlet, wherein said second seal surface is at an angle relative to said first seal surface.

5. An air intake assembly for a climate control system as set forth in claim 4 wherein said door is pivotally secured to said housing and operative to pivot between a first position to selectively close said fresh air inlet and a second position to selectively close said recirculation air inlet;

said door including a substantially planar member having first and second sides;

a seal member located on each of said first and second sides of said door.

6. An air intake assembly for a climate control system as set forth in claim 4 including first and second pockets located in said wall, said fresh air inlet located in said first pocket and said recirculation air inlet located in said second pocket, said fresh air inlet and said recirculation air inlet each having at least one aperture extending through said wall; and said first and second seal surfaces adjacent said fresh air inlet extending about the periphery of said fresh air inlet and said first and second seal surfaces adjacent said recirculation air inlet extending about the periphery of said recirculation air inlets.

7. An air intake assembly for a climate control system as set forth in claim 6 wherein each of said first and second pockets includes a base portion and at least one sidewall extending outward from said inner surface of said wall and away from said inlet chamber, said respective fresh air and recirculation air inlets formed in said base portions.

8. An air intake assembly for a climate control system as set forth in claim 7 wherein each of said pockets includes a beveled portion extending between said base portion and said sidewall, said beveled portion forming an additional seal surface.

9. An air intake assembly for a climate control system as set forth in claim 8 wherein said seal member includes a foam member.

10. An air intake assembly for a climate control system as set forth in claim 8 wherein at least a portion of said seal member engages said beveled portion of said pocket forming said additional seal surface whereby when said door member is moved to selectively close one of said fresh air inlet and said recirculation air inlet, said seal member is compressed against said beveled portion of said pocket.

11. An air intake assembly for a climate control system comprising:

a housing including a wall, said wall having an inner surface, said inner surface defining in part, an inlet chamber, a plurality of openings in said wall, said openings defining a fresh air inlet and a recirculation air inlet in said wall whereby air is drawn into said inlet chamber through said inlets;

said housing having a first pocket formed in said wall, said first pocket having a pair of sidewalls extending outwardly from said wall, a first base portion spaced from said inner surface of said wall extending between said sidewalls and said inlet located on said first base portion;

a seal surface located on said first base portion and adjacent said inner surface of said wall and extending around the periphery of said inlet fresh air, said seal surface offset from said inner surface of said wall;

said housing having a second pocket formed in said wall, said second pocket having a pair of sidewalls extending outwardly from said wall, a second base portion spaced from said inner surface of said wall extending between said sidewalls and said inlet located in said second base portion, said recirculation air inlet located on said second base portion;

a door, said door secured to said housing and operative to selectively open and close said inlets; and a compressible seal member, engaging both said seal surface and said door such that when said door closes said fresh air inlet, said seal member is disposed in said first pocket and the portion of the seal member near the proximal end of the door is compressed substantially the same as the portion of the seal member located near the distal end of the door.

12. An air intake assembly for a climate control system as set forth in claim 11 wherein said seal member includes a foam member.

13. An air intake assembly for a climate control system as set forth in claim 11 including said housing having a sidewall extending outwardly from said inner surface and away from said inlet chamber, a base portion having a planar surface, said base portion engaging said sidewall, said inlet formed in said base portion and said seal surface located on said base portion between said inlet and said sidewall.

14. An air intake assembly for a climate control system as set forth in claim 13 including a beveled portion extending between said base portion and said sidewall, said beveled portion forming an additional seal surface.

15. An air intake assembly for a climate control system as set forth in claim 11 wherein said seal member is located on said seal surface.

16. An air intake assembly for a climate control system as set forth in claim 14 wherein at least a portion of said seal member engages said beveled portion forming said additional seal surface when said door member is positioned to close said inlet.

* * * * *